US012602578B2

(12) United States Patent
Zheng et al.

(10) Patent No.: US 12,602,578 B2
(45) Date of Patent: Apr. 14, 2026

(54) LIGHT SOURCE COLOR COORDINATE ESTIMATION SYSTEM AND DEEP LEARNING METHOD THEREOF

(71) Applicants: Lite-On Singapore Pte. Ltd., Singapore (SG); LITE-ON TECHNOLOGY CORPORATION, Taipei City (TW)

(72) Inventors: Rui-Tao Zheng, Singapore (SG); I-Chen Chien, Keelung City (TW)

(73) Assignees: Lite-On Singapore Pte. Ltd., Singapore (SG); LITE-ON TECHNOLOGY CORPORATION, Taipei City (TW)

( * ) Notice: Subject to any disclaimer, the term of this patent is extended or adjusted under 35 U.S.C. 154(b) by 951 days.

(21) Appl. No.: 17/737,938

(22) Filed: May 5, 2022

(65) Prior Publication Data

US 2023/0259752 A1 Aug. 17, 2023

(30) Foreign Application Priority Data

Feb. 16, 2022 (CN) .......................... 202210141580.0

(51) Int. Cl.
*G06N 3/067* (2006.01)
*G06N 3/063* (2023.01)

(52) U.S. Cl.
CPC ............. *G06N 3/067* (2013.01); *G06N 3/063* (2013.01)

(58) Field of Classification Search
CPC .......... G06N 3/067; G06N 3/063; G06N 3/06; G06N 3/02

USPC .......................................................... 706/15
See application file for complete search history.

(56) References Cited

U.S. PATENT DOCUMENTS

| | | | | | |
|---|---|---|---|---|---|
| 5,185,850 A | * | 2/1993 | Usui | ........................ | G06N 3/09 |
| | | | | | 358/518 |
| 5,285,297 A | * | 2/1994 | Rose | .................... | H04N 1/6033 |
| | | | | | 358/518 |
| 7,180,629 B1 | * | 2/2007 | Nishio | .................... | H04N 23/88 |
| | | | | | 358/1.9 |
| 8,229,167 B2 | | 7/2012 | Lee et al. | | |

(Continued)

FOREIGN PATENT DOCUMENTS

| | | | | |
|---|---|---|---|---|
| CN | 112683923 A | | 4/2021 | |
| CN | 113506343 A | * | 10/2021 | ............. G06N 3/045 |
| TW | I375544 B1 | | 11/2012 | |

*Primary Examiner* — Hwei-Min Lu
(74) *Attorney, Agent, or Firm* — Li & Cai Intellectual Property Office

(57) ABSTRACT

A light source color coordinate estimation system and a deep learning method thereof are provided. The light source color coordinate estimation system includes a plurality of photo detectors, a normalization calculation circuit, and a neural network. The photo detectors generate spectral responses after receiving a beam emitted by a light source. The spectral responses respectively have different detection wavebands and energy integral values corresponding to the detection wavebands. The normalization calculation circuit respectively divides the energy integral values by a largest of the energy integral values to generate a plurality of normalized energy integral values. An input end of the neural network receives the normalized energy integral values and converts the normalized energy integral values into an estimated color coordinate. An output end of the neural network outputs the estimated color coordinate.

11 Claims, 10 Drawing Sheets

(56)          References Cited

U.S. PATENT DOCUMENTS

| | | | | |
|---|---|---|---|---|
| 8,490,034 | B1 * | 7/2013 | Torunoglu | G03F 7/70441 |
| | | | | 716/55 |
| 10,345,151 | B1 * | 7/2019 | Sarkar | G01J 3/0272 |
| 2002/0038294 | A1 * | 3/2002 | Matsugu | G06N 3/049 |
| | | | | 706/20 |
| 2002/0168101 | A1 * | 11/2002 | Woodall | G01J 3/462 |
| | | | | 382/162 |
| 2005/0062446 | A1 * | 3/2005 | Ashdown | H05B 45/20 |
| | | | | 315/324 |
| 2007/0013785 | A1 * | 1/2007 | Kinoshita | H04N 23/70 |
| | | | | 348/222.1 |
| 2012/0044496 | A1 * | 2/2012 | Wang | G01J 3/465 |
| | | | | 356/402 |
| 2015/0146998 | A1 * | 5/2015 | Fuchigami | H04N 25/531 |
| | | | | 382/275 |
| 2016/0232828 | A1 * | 8/2016 | Jia | G01J 1/4204 |
| 2019/0301932 | A1 * | 10/2019 | Sarkar | G01J 3/465 |
| 2021/0345469 | A1 * | 11/2021 | Zhou | G01J 1/44 |
| 2022/0232686 | A1 * | 7/2022 | Wang | H05B 47/165 |

* cited by examiner

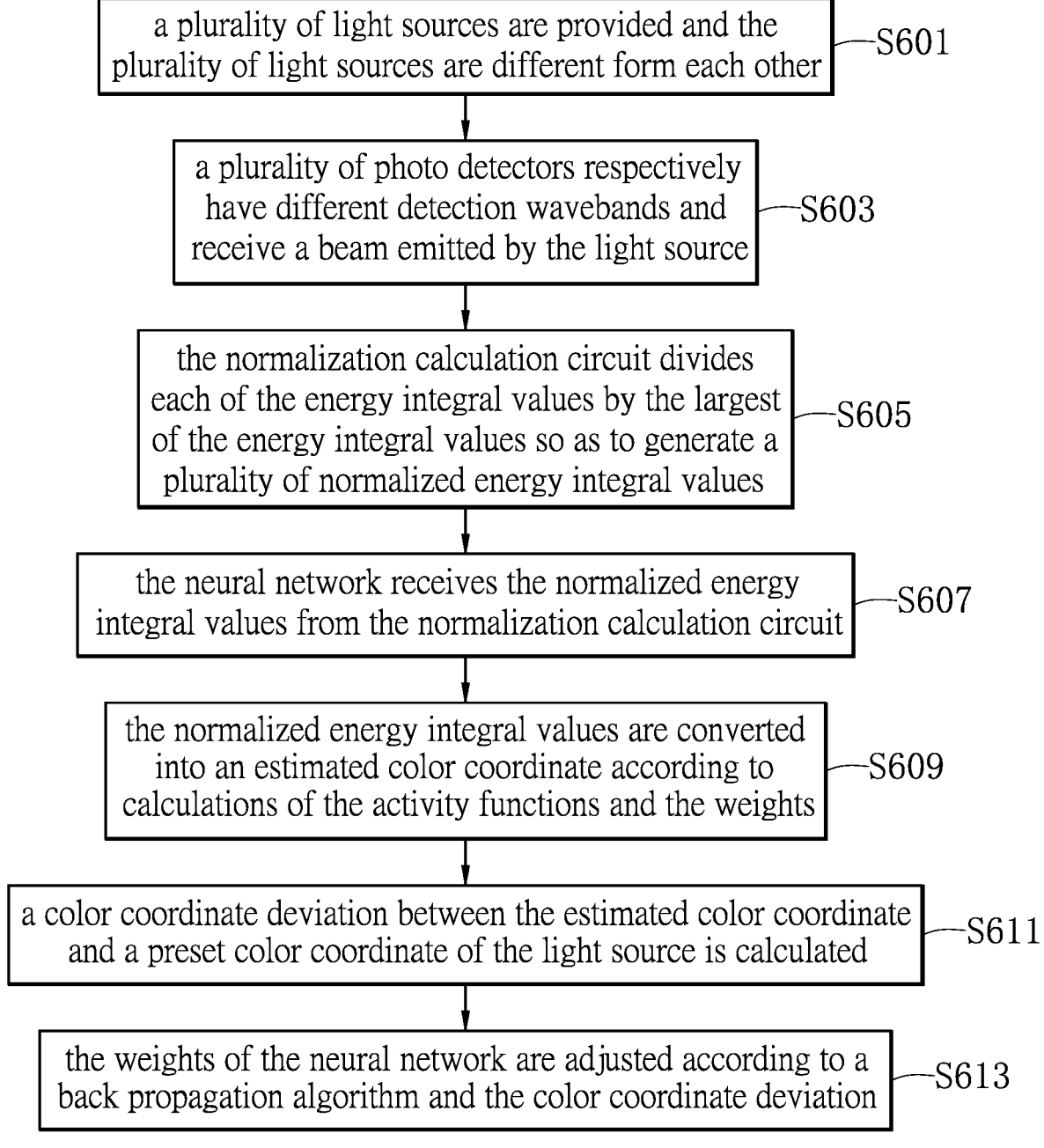

a plurality of light sources are provided and the plurality of light sources are different form each other — S601 a plurality of photo detectors respectively have different detection wavebands and receive a beam emitted by the light source — S603 the normalization calculation circuit divides each of the energy integral values by the largest of the energy integral values so as to generate a plurality of normalized energy integral values — S605 the neural network receives the normalized energy integral values from the normalization calculation circuit — S607 the normalized energy integral values are converted into an estimated color coordinate according to calculations of the activity functions and the weights — S609 a color coordinate deviation between the estimated color coordinate and a preset color coordinate of the light source is calculated — S611 the weights of the neural network are adjusted according to a back propagation algorithm and the color coordinate deviation — S613

FIG. 6

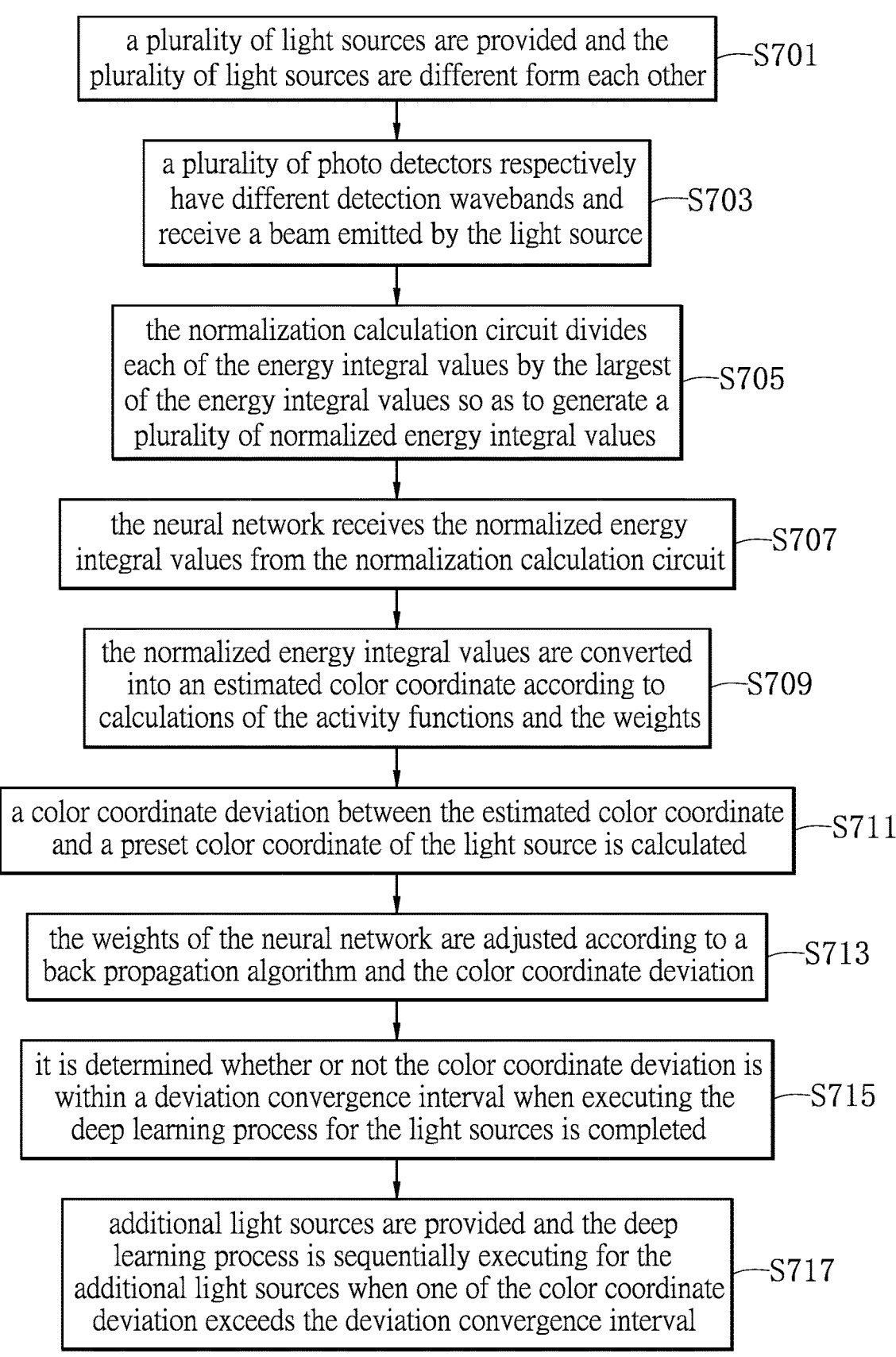

a plurality of light sources are provided and the plurality of light sources are different form each other ——S701 a plurality of photo detectors respectively have different detection wavebands and receive a beam emitted by the light source ——S703 the normalization calculation circuit divides each of the energy integral values by the largest of the energy integral values so as to generate a plurality of normalized energy integral values ——S705 the neural network receives the normalized energy integral values from the normalization calculation circuit ——S707 the normalized energy integral values are converted into an estimated color coordinate according to calculations of the activity functions and the weights ——S709 a color coordinate deviation between the estimated color coordinate and a preset color coordinate of the light source is calculated ——S711 the weights of the neural network are adjusted according to a back propagation algorithm and the color coordinate deviation ——S713 it is determined whether or not the color coordinate deviation is within a deviation convergence interval when executing the deep learning process for the light sources is completed ——S715 additional light sources are provided and the deep learning process is sequentially executing for the additional light sources when one of the color coordinate deviation exceeds the deviation convergence interval ——S717

FIG. 7

LIGHT SOURCE COLOR COORDINATE ESTIMATION SYSTEM AND DEEP LEARNING METHOD THEREOF

CROSS-REFERENCE TO RELATED PATENT APPLICATION

This application claims the benefit of priority to China Patent Application No. 202210141580.0, filed on Feb. 16, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a light source color coordinate estimation system and a deep learning method thereof, and more particularly to a light source color coordinate estimation system based on a neural network and a deep learning method thereof.

BACKGROUND OF THE DISCLOSURE

Different color coordinates represent different color temperatures and their color characteristics. The current way to obtain a color coordinate of a light source is by obtaining RGB values of the light source through a sensor, and then multiplying the RGB values by a conversion matrix to calculate the color coordinate.

However, converting the RGB values to the color coordinate generates deviations. In addition, some light sources have a brighter surface that has a higher reflectivity, and some other light sources have a rougher surface that has a lower reflectivity. A difference in the reflectivity of a surface of a light source and a difference in an intensity of a beam emitted by a light source can also cause a color coordinate deviation.

SUMMARY OF THE DISCLOSURE

In response to the above-referenced technical inadequacies, the present disclosure provides a light source color coordinate estimation system and a deep learning method thereof.

In one aspect, the present disclosure provides a light source color coordinate estimation system. The light source color coordinate estimation system includes a plurality of photo detectors, a normalization calculation circuit, and a neural network. The photo detectors generate spectral responses after receiving a beam emitted by a light source. The spectral responses respectively have different detection wavebands and energy integral values corresponding to the detection wavebands. The normalization calculation circuit is electrically connected to the plurality of photo detectors, and the normalization calculation circuit respectively divides the energy integral values by a largest of the energy integral values to generate a plurality of normalized energy integral values. An input end of the neural network is electrically connected to the normalization calculation circuit, and the neural network includes a plurality of neurons. The neurons are connected by a plurality of synapses. Each of the neurons has a weight, and at least a part of the neurons respectively include activity functions. The input end of the neural network receives the normalized energy integral values and converting the normalized energy integral values into an estimated color coordinate by operations of the activity functions and the weights. An output end of the neural network outputs the estimated color coordinate of the light source.

In certain embodiments, a sum of the detection wavebands covers a range from 380 nm to 700 nm.

In certain embodiments, the neurons include a plurality of input-layer neurons, and the input-layer neurons are located at an input layer of the neural network. A number of the input-layer neurons is the same as the number of the photo detectors, and the input-layer neurons respectively obtain the normalized energy integral values.

In certain embodiments, the neural network includes an input layer, a plurality of hidden layers and an output layer, the input layer and the output layer are respectively connected with two of the hidden layers, and any two adjacent ones of the hidden layers are connected to each other. The neuron includes a plurality of hidden layer neurons, and each of the hidden layers includes a part of the hidden layer neurons.

In certain embodiments, each of the activity functions of the hidden layer neurons is a sigmoid function.

In certain embodiments, each of the detection wavebands of the photo detectors are different from each other.

In certain embodiments, the plurality of photo detectors are disposed at a user device, and the normalization calculation circuit and the neural network are disposed at a remote host.

In certain embodiments, the plurality of photo detectors, the normalization calculation circuit and the neural network are disposed in a system chip.

In another aspect, the present disclosure provides a deep learning method of a light source color coordinate estimation system. The deep learning method includes: providing a plurality of light sources that are different from each other; and sequentially executing a deep learning process for the light sources. Executing the deep learning process for each of the light sources includes: obtaining energy integral values that correspond to different detection wavebands of the light source by a plurality of photo detectors; dividing the energy integral values by a largest of the energy integral values, through a normalization calculation circuit so as to generate a plurality of normalized energy integral values; receiving the plurality of normalized energy integral values through a neural network, in which the neural network includes activity functions and weights; converting the plurality of normalized energy integral values into an estimated color coordinate of the light source by calculations of the activity functions and the weights; calculating a color coordinate deviation between the estimated color coordinate and a preset color coordinate; and adjusting at least one of the weights according to a back propagation algorithm and the color coordinate deviation.

In certain embodiments, a sum of the detection wavebands covers a range from 380 nm to 700 nm.

In certain embodiments, the deep learning method further includes: determining whether or not the color coordinate deviation is within a deviation convergence interval when executing the deep learning process for the light sources is completed, and providing additional light sources and sequentially executing the deep learning process for the additional light sources when one of the color coordinate deviations exceeds the deviation convergence interval.

In certain embodiments, a test light source is provided when each of the color coordinate deviations is within a deviation convergence interval, the test light source emits a test beam, and the light source color coordinate estimation system receives the test beam so as to generate an estimated color coordinate of the test beam.

Therefore, in the light source color coordinate estimation system and a deep learning method thereof provided by the present disclosure, the neural network performs a deep learning process for the sensing differences of different photo detectors and obtains normalized energy integral values from the photo detectors. A sum of spectral responses of the photo detectors preferably covers a range of a visible light waveband (380 nm-700 nm). Therefore, the neural network has high anti-interference capability such that it can estimate a color coordinate more accurately. Furthermore, the normalization calculation circuit normalizes energy integral values of the photo detectors each time a light source emits a beam. Therefore, the energy integral value detected by each of the photo detectors is not weakened due to an intensity of the beam emitted by the light source or a reflectivity of a surface of the light source such that the estimated color coordinate is more precise.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 6 is a flowchart of a deep learning method of the light source color coordinate estimation system according to the first embodiment of the present disclosure;

FIG. 7 is a flowchart of a deep learning method of the light source color coordinate estimation system according to the second embodiment of the present disclosure;

DETAILED DESCRIPTION OF THE EXEMPLARY EMBODIMENTS

Figure 1:
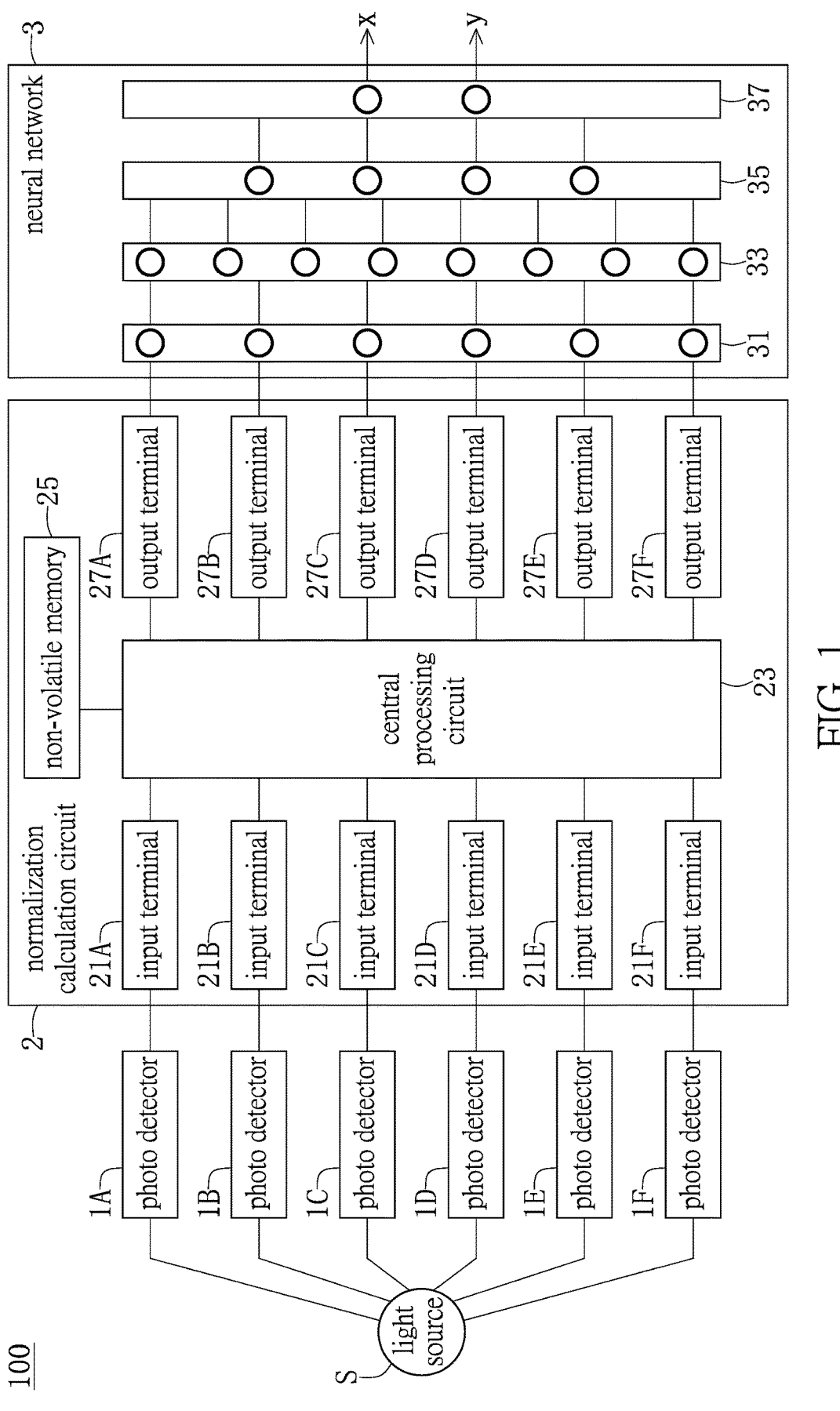
FIG. 1 is a functional block diagram of a light source color coordinate estimation system according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1, a first embodiment of the present disclosure provides a light source color coordinate estimation system 100. The light source color coordinate estimation system 100 includes a plurality of photo detectors 1A to 1F, a normalization calculation circuit 2, and a neural network 3, and the photo detectors 1A to 1F have one detection waveband or respectively have different detection wavebands. The photo detectors 1A to 1F detect energy integral values corresponding to the detection wavebands of a beam emitted by a light source S, wherein a sum of the detection wavebands preferably covers a range of a visible light waveband (380 nm~700 nm). The photo detectors 1A to 1F are electrically connected to the normalization calculation circuit 2, respectively, and the normalization calculation circuit 2 is further electrically connected to the neural network 3. The neural network 3 outputs a first estimated color coordinate value x and a second estimated color coordinate value y, and the first estimated color coordinate value x and the second estimated color coordinate value y form an estimated color coordinate (x, y). A color of a beam emitted by the light source can be known through the estimated color coordinate (x, y).

Figure 2:
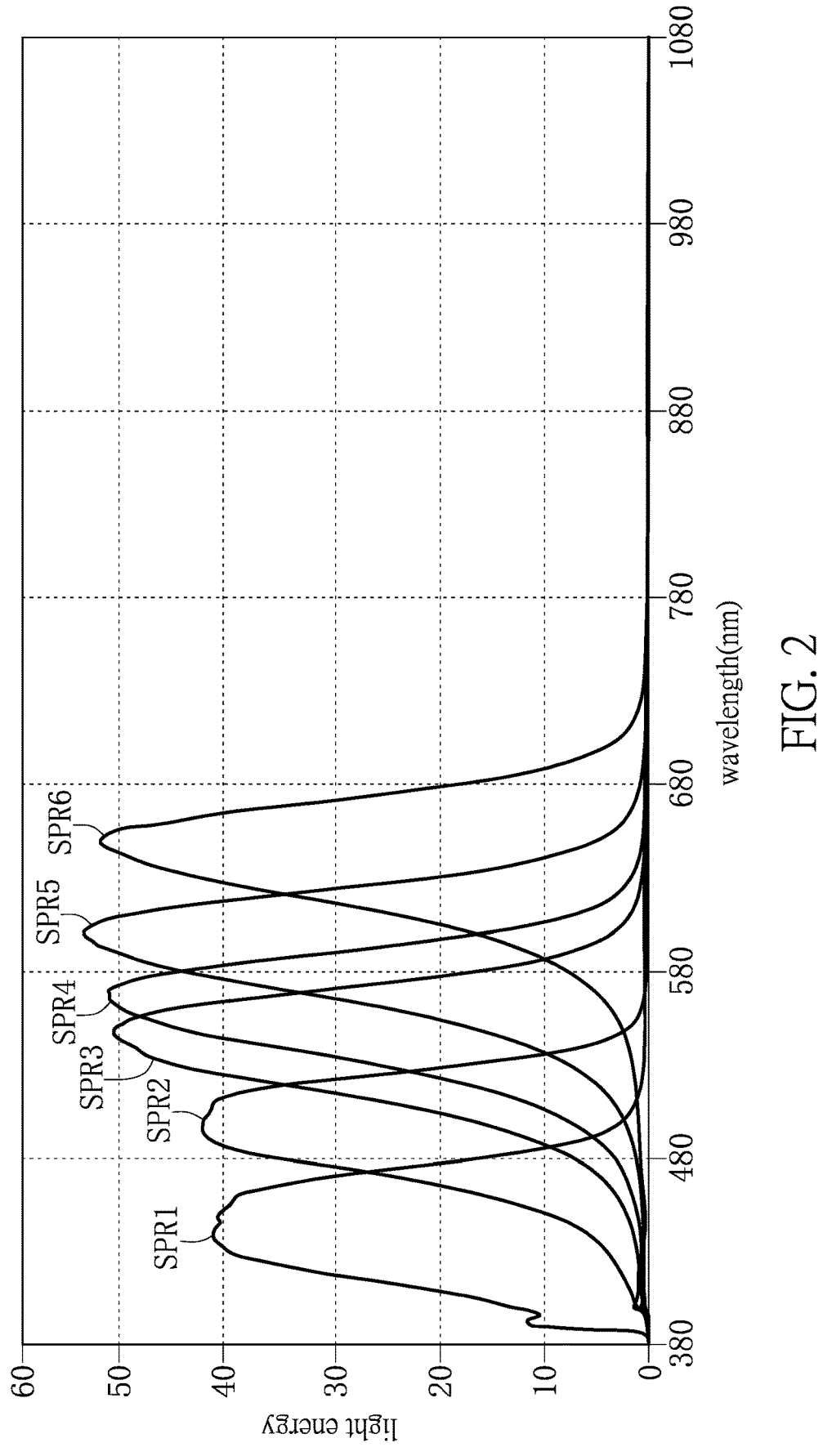
FIG. 2 is a chart of correlations between spectral responses and wave lengths of six photo detectors of FIG. 1.

Referring to FIG. 2, a unit of a horizontal axis is wavelength (nm), a unit of a vertical axis is light energy, the curves SPR1 to SPR6 respectively represent six spectral responses of the photo detectors 1A to 1F, and each of the spectral responses represents a detection waveband and energy intensity in the detection waveband when a light source emits a beam to the corresponding photo detector. The detection wavebands of the photo detectors are different from each other, and any two of the detection wavebands may be partially overlapped and are not completely identical, such that a diversity of a detecting range may be increased as much as possible. Each of the photo detectors 1A to 1F sums up energies in the corresponding detection waveband to obtain a corresponding energy integral value. As shown in FIG. 2, a sum of the detection wavebands, for example, is from 380 nm to 730 nm and covers a range of the visible light waveband (380 nm~700 nm), thereby avoiding an inaccurate detection result due to depletion regions in the visible light band.

Regarding embodiments of the photo detectors 1A to 1F, for example, each of the photo detectors can be implemented by a hardware device, wherein the hardware device includes any combination of a circuit board, a diode, a metal semiconductor field effect transistor (MOSFET), a bipolar junction transistor (BJT), a resistance, an inductance, and a capacitance. Alternatively, the photo detector can also be implemented by a firmware, for example, the photo detector can also be implemented by editing a hardware language (e.g., VHDL) and burning the hardware language into a microcontroller (MCU) or a field programmable gate array (FPGA). Alternatively, the photo detector can be implemented by software, for example, the photo detector can also be implemented by editing a C programming language.

Referring to FIG. 1, the normalization calculation circuit 2 includes six input terminals 21A to 21F, a central processing circuit 23, a non-volatile memory 25, and six output terminals 27A to 27F. The six input terminals 21A to 21F are respectively electrically connected to the photo detectors 1A to 1F, and the central processing circuit 23 is electrically connected to the six input terminals 21A to 21F, the non-volatile memory 25, and the six output terminals 27A to 27F. The normalization calculation circuit 2 obtains six different energy integral values respectively through the six input terminals 21A to 21F. The non-volatile memory 25 is a read only memory (ROM), a flash memory, or a non-volatile random-access memory (NVRAM) and stores a normalization algorithm. The normalization algorithm includes finding a largest of N different values and dividing the N different values by the largest of N different values to generate N normalized values.

In this embodiment, the central processing circuit 23 reads and executes the normalization algorithm stored in the non-volatile memory 25 to normalize the six energy integral values. Normalizing the six energy integral values includes finding a largest of the six energy integral values and dividing the six energy integral values by the largest of the six energy integral values to generate six normalized energy integral values.

Regarding embodiments of the normalization calculation circuit 2, for example, the normalization calculation circuit 2 can be implemented by a hardware device, wherein the hardware device includes any combination of a circuit board, a diode, a metal semiconductor field effect transistor (MOSFET), a bipolar junction transistor (BJT), a resistance, an inductance, and a capacitance. Alternatively, the normalization calculation circuit 2 can also be implemented by a firmware, for example, the normalization calculation circuit 2 can be implemented by editing a hardware language (e.g., VHDL) and burning the hardware language into a microcontroller (MCU) or a field programmable gate array (FPGA). Alternatively, the normalization calculation circuit 2 can be implemented by software, for example, the normalization calculation circuit 2 can be implemented by editing a C programming language.

A normalization process of the normalization calculation circuit 2 at least generates the following advantageous effects: the normalization calculation circuit 2 normalizes the energy integral values detected by the plurality of photo detectors each time when a light source S emits a beam. Therefore, the energy integral value of the photo detector is not weakened by a difference in an intensity of the beam emitted by the light source S or a difference in a reflectivity of a surface of the light source S.

Referring to FIG. 1, the neural network 3 includes an input layer 31, a first hidden layer 33, a second hidden layer 35, and an output layer 37. In this embodiment, the input layer 31 includes six input-layer neurons. The six output terminals 27A to 27F of the normalization calculation circuit 2 are respectively connected with the six input-layer neurons of the input layer 31 such that the six input-layer neurons of the input layer 31 obtain six normalized energy integral values, respectively.

In this embodiment, the first hidden layer 33 includes eight hidden-layer neurons, and each of the input-layer neurons of the input layer 31 is connected to the eight hidden layer neurons of the first hidden layer 33 via eight synapses, such that forty-eight synapses are connected between the input layer 31 and the first hidden layer 33, and each of the forty-eight synapses has a specific weight. Therefore, an output value of each of the input-layer neurons of the input layer 31 is respectively multiplied by eight weights and then transmitted to the eight hidden layer neurons of the first hidden layer 33 respectively. Each of the hidden layer neurons of the first hidden layer 33 has a preset activity function for converting an input value of a hidden layer neuron into an output value of the hidden-layer neuron, and the activity function is, for example, a sigmoid function or a relu function, but is not limited thereto.

Regarding a calculation between the input layer 31 and the first hidden layer 33, for example, six input-layer neurons of the input layer 31 are connected to a first hidden-layer neuron of the first hidden layer 33 via six synapses respectively, and weights of the six synapses are w1 to w6 respectively, and output values of the six input-layer neurons of the input layer 31 are x1 to x6 respectively. Therefore, an input value received by the first hidden layer neuron of the first hidden layer 33 is y1, and y1=x1*w1+x2*w2+x3*w3+ x4*w4+x5*w5+x6*w6.

An activity function of the first hidden-layer neuron of the first hidden layer 33 is σ(x), and $$\sigma(x) = \frac{1}{1 + e^{-x}}.$$

Therefore, an output value of the first hidden-layer neuron of the first hidden layer 33 is σ(y1). According to the above mentioned formula, the output values of the other seven hidden layer neurons of the first hidden layer 33 can be calculated in the same way.

In this embodiment, the second hidden layer 35 includes four hidden layer neurons, and each of the hidden layer neurons of the first hidden layer 33 is connected to four hidden layer neurons of the second hidden layer 35 via four synapses, such that thirty-two synapses are connected between the first hidden layer 33 and the second hidden layer 35, and each of the thirty-two synapses has a specific weight. Therefore, an output value of each of the hidden layer neurons of the first hidden layer 33 is respectively multiplied by four weights and then transmitted to the four hidden layer neurons of the second hidden layer 35 respectively. Each of the hidden layer neurons of the second hidden layer 35 has a preset activity function for converting an input value of a hidden layer neuron into an output value of the hidden-layer neuron.

Regarding a calculation between the first hidden layer 33 and the second hidden layer 35, for example, eight hidden layer neurons of the first hidden layer 33 are connected to a first hidden layer neuron of the second hidden layer 35 via eight synapses respectively, and weights of the eight synapses are w7~w14 respectively, and output values of the eight hidden layer neurons of the first hidden layer 33 are x7~x14 respectively. Therefore, an input value of the first hidden layer neuron of the second hidden layer 35 is y2, and y2=x7*w7+x8*w8+x9*w9+x10*w10+x11*w11+x12*w12+x13*w13+x14*w14.

An activity function of the first hidden layer neuron of the second hidden layer 35 is σ(x), and $$\sigma(x) = \frac{1}{1 + e^{-x}}.$$

Therefore, an output value of the first hidden layer neuron of the second hidden layer 35 is σ(y2). According to the above mentioned formula, the output values of other three hidden-layer neurons of the second hidden layer 35 can be calculated in the same way.

In this embodiment, the output layer 37 includes two output layer neurons, and each of the hidden layer neurons of the second hidden layer 35 is connected to the two output layer neurons of the output layer 37 via two synapses, such that eight synapses are connected between the second hidden layer 35 and the output layer 37, and each of the eight synapses has a specific weight. Therefore, an output value of each of the hidden layer neurons of the second hidden layer 35 is respectively multiplied by two weights and then transmitted to the two output layer neurons of the output layer 37 respectively. Each of the output layer neurons of the output layer 37 has a preset activity function for converting an input value of each of the output layer neurons into an output value of the output layer neuron. The two output layer neurons of the output layer 37 respectively output a first estimated color coordinate x and a second estimated color coordinate y.

Regarding a calculation between the second hidden layer 35 and the output layer 37, for example, four hidden layer neurons of the second hidden layer 35 are connected to a first output layer neuron of the output layer 37 via four synapses respectively, and weights of the four synapses are w15~w18 respectively. Therefore, an input value of the first output layer neuron of the output layer 37 is y3, and y3=x15*w15+x16*w16+x17*w17+x18*w18.

An activity function of the first output layer neuron of the output layer 37 is σ(x), and $$\sigma(x) = \frac{1}{1 + e^{-x}}.$$

Therefore, an output value of the first output layer neuron of the output layer 37 is σ(y3). According to the above formula, an output value of other output layer neurons of the output layer 37 can be calculated in the same way.

Regarding embodiments of the neural network 3, for example, the neural network 3 can be implemented by a hardware device, wherein the hardware device includes any combination of a circuit board, a diode, a metal semiconductor field effect transistor (MOSFET), a bipolar junction transistor (BJT), a resistance, an inductance, and a capacitance. Alternatively, the neural network 3 can also be implemented by a firmware, for example, the neural network 3 can be implemented by editing a hardware language (e.g., VHDL) and burning the hardware language into a microcontroller (MCU) or a field programmable gate array (FPGA). Alternatively, the neural network 3 can be implemented by software, for example, the neural network 3 can be implemented by editing a C programming language.

However, the aforementioned description for the light source color coordinate estimation system 100 of the first embodiment is merely an example, and is not meant to limit the scope of the present disclosure.

Second Embodiment

Figure 3:
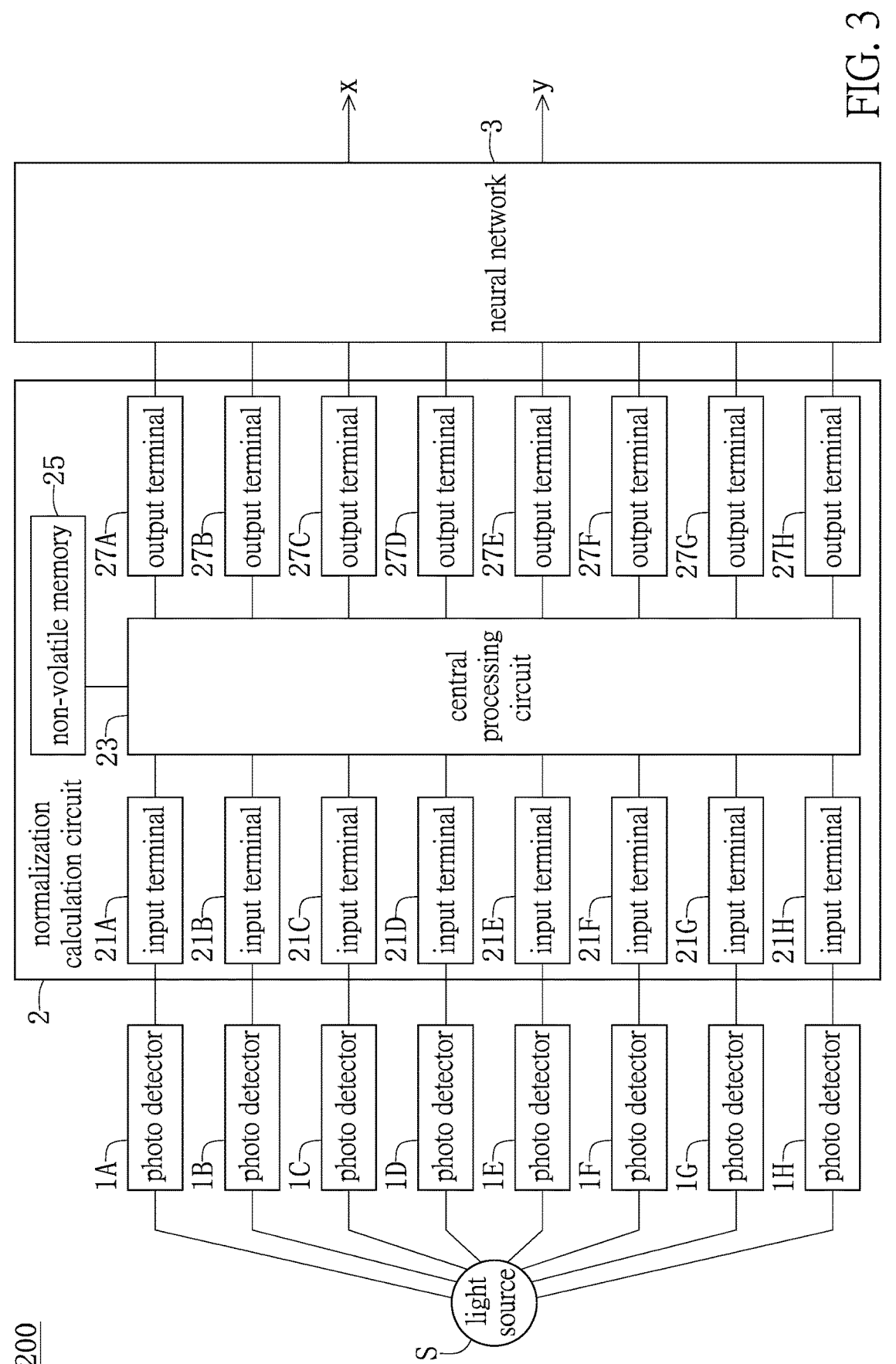
FIG. 3 is a functional block diagram of a light source color coordinate estimation system according to a second embodiment of the present disclosure.

Referring to FIG. 3, a second embodiment of the present disclosure provides a light source color coordinate estimation system 200. Comparing FIG. 3 with FIG. 1, the main difference between the second embodiment and the first embodiment lies in that, in the second embodiment, the light source color coordinate estimation system 200 includes eight photo detectors 1A to 1H, the normalization calculation circuit 2 includes eight input terminals 21A to 21H, and the eight input terminals 21A to 21H are electrically connected to the photo detectors 1A to 1H, respectively. The central processing circuit 23 is electrically connected to the eight input terminals 21A to 21H. The central processing circuit 23 reads and executes the normalization algorithm stored in the non-volatile memory 25, so as to normalize eight energy integral values detected by the eight photo detectors. Normalizing the eight energy integral values includes finding a largest of the eight energy integral values and respectively dividing the eight energy integral values by the largest of the eight energy integral values to generate eight normalized energy integral values. The input layer 31 of the neural network 3 includes eight input-layer neurons, and eight output terminals 27A to 27H of the normalization calculation circuit 2 are respectively connected with the eight input-layer neurons of the input layer 31 such that the eight input-layer neurons of the input layer 31 respectively obtain eight normalized energy integral values.

However, the aforementioned description for the light source color coordinate estimation system 200 of the second embodiment is merely an example, and is not meant to limit the scope of the present disclosure.

Third Embodiment

Figure 4:
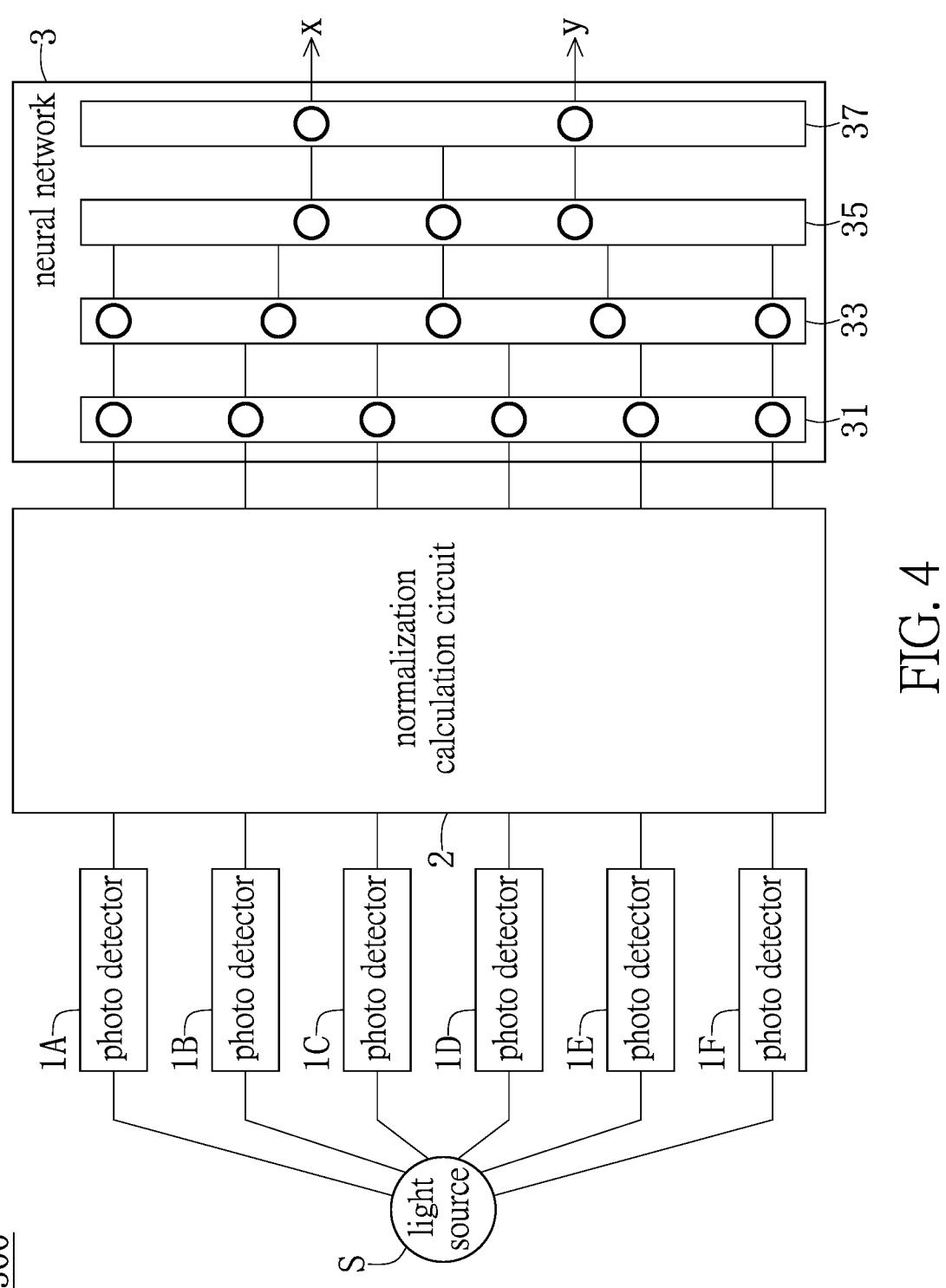
FIG. 4 is a functional block diagram of a light source color coordinate estimation system according to a third embodiment of the present disclosure.

Referring to FIG. 4, a third embodiment of the present disclosure provides a light source color coordinate estimation system 300. Comparing FIG. 4 with FIG. 1, the main difference between the third embodiment and the first embodiment lies in that, in the third embodiment, the first hidden layer 33 includes five hidden layer neurons, and the second hidden layer 35 of the light source color coordinate estimation system 300 includes three hidden layer neurons. Each of the hidden layer neurons of the first hidden layer 33 is connected to six input-layer neurons of the input layer 31 via six synapses. The number of synapses between the first hidden layer 33 and the input layer 31 is thirty and each of the thirty synapses has a specific weight. Each of the three hidden layer neurons of the second hidden layer 35 is connected to the five hidden layer neurons of the first hidden layer 33 via five synapses. The number of synapses between the first hidden layer 33 and the second hidden layer 35 is fifteen and each of the fifteen synapses has a specific weight.

However, the aforementioned description for the light source color coordinate estimation system 300 of the third embodiment is merely an example, and is not meant to limit the scope of the present disclosure.

Fourth Embodiment

Figure 5:
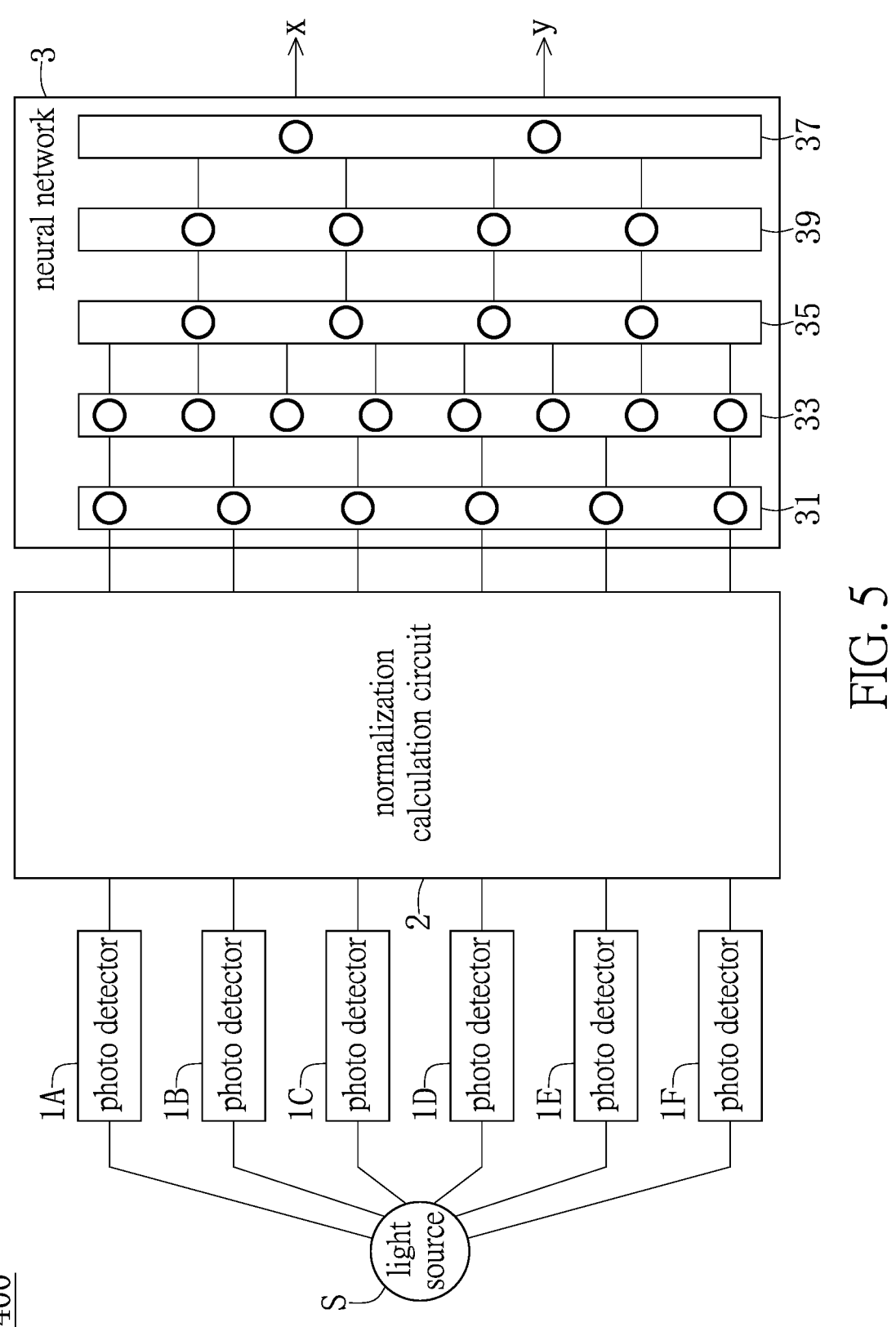
FIG. 5 is a functional block diagram of a light source color coordinate estimation system according to a fourth embodiment of the present disclosure.

Referring to FIG. 5, a fourth embodiment of the present disclosure provides a light source color coordinate estimation system 400. Comparing FIG. with FIG. 1, the main difference between the fourth embodiment and the first embodiment lies in that, in the fourth embodiment, in addition to the input layer 31, the first hidden layer 33, the second hidden layer 35, and the output layer 37, the neural network 3 further includes a third hidden layer 39. The third hidden layer 39 is between the second hidden layer 35 and the output layer 37, and the third hidden layer 39 includes four hidden layer neurons. Each of the hidden layer neurons of the second hidden layer 35 is connected to the four hidden layer neurons of the third hidden layer 39 via four synapses. The number of synapses between the second hidden layer 35 and the third hidden layer 39 is sixteen, and each of the sixteen synapses has a specific weight. Each of the hidden layer neurons of the third hidden layer 39 is connected to two output layer neurons of the output layer 37 via two synapses. The number of synapses between the third hidden layer 39 and the output layer 37 is eight, and each of the eight synapses has a specific weight.

However, the aforementioned description for the light source color coordinate estimation system 400 of the fourth embodiment is merely an example, and is not meant to limit the scope of the present disclosure.

According to the four embodiments of the light source color coordinate estimation system shown in FIG. 1, FIG. 3, FIG. 4 and FIG. 5, the number of photo detectors, the number of neurons of a hidden layer, the number of hidden layers and an activity function of a neuron can be adjusted according to a requirement and an accuracy of an estimated color coordinate.

FIG. 6 is a flowchart of a deep learning method of the light source color coordinate estimation system according to the first embodiment of the present disclosure. In step S601, a plurality of light sources are provided and the plurality of light sources are different form each other. A deep learning process is sequentially executing for the light sources. For example, when a number of the light sources is ten, each of the ten light source emits a beam to the light source color coordinate estimation system, so that the light source color coordinate estimation system obtains a piece of training data. When the number of light sources is ten, the light source color coordinate system obtains ten pieces of training data in total and the number of times of performing the deep learning process is ten. The deep learning process at least includes steps as follows.

In step S603, a plurality of photo detectors respectively have different detection wavebands and receive a beam emitted by the light source, and the plurality of photo detectors respectively detect energy integral values corresponding to the detection wavebands. A sum of the detection wavebands preferably covers a range of the visible light waveband (380 nm-700 nm). For example, a number of the photo detectors is five, and the photo detectors respectively correspond to five different detection wavebands of a red light, a green light, a blue light, a yellow light, and a violet light, and the five detection wavebands are partially overlapped and a sum of the five detection wavebands covers the range of the visible light waveband (380 nm-700 nm).

In step S605, the normalization calculation circuit 2 divides each of the energy integral values by the largest of the energy integral values so as to generate a plurality of normalized energy integral values. For example, detection wavebands of five photo detectors respectively correspond to red light, green light, blue light, yellow light, and violet light, and the largest of the energy integral values corresponds to the violet light, and the normalization calculation circuit 2 respectively divides energy integral values of the red light, the green light, the blue light, the yellow light, and the violet light by the energy integral value of the violet light to generate five normalized energy integral values.

In a step S607, the neural network 3 receives the normalized energy integral values from the normalization calculation circuit 2, and the neural network 3 includes a plurality of activity functions and a plurality of weights.

In step S609, the normalized energy integral values are converted into an estimated color coordinate according to calculations of the activity functions and the weights.

In step S611, a color coordinate deviation between the estimated color coordinate and a preset color coordinate of the light source is calculated. For example, an estimated color coordinate x and an estimated color coordinate y calculated by the light source color coordinate estimation system are 0.3 and 0.2 respectively, and a preset color coordinate x and a preset color coordinate y of the light source are 0.25 and 0.15 respectively. An x-axis color coordinate deviation is −0.5, and a y-axis color coordinate deviation is −0.05.

In step S613, the weights of the neural network 3 are adjusted according to a back propagation algorithm and the color coordinate deviation. For example, an input layer of a neural network has i neurons, a hidden layer of the neural network has j neurons, and an output layer of the neural network has k neurons. An estimated value of the output layer is $A_k$, a target value of the output layer is $T_k$, and an deviation function is E, in which $$E = \frac{1}{2}\sum\nolimits_k (T_k - A_k).$$

The back propagation algorithm minimizes the deviation function by adjusting weights $W_{ij}$ of synapses between the input layer and the hidden layer and weights $W_{jk}$ of synapses between the hidden layer and the output layer.

A formula for adjusting the weights $W_{ij}$ is:

$$\Delta W_{ij} = -\delta \frac{\partial E}{\partial W_{ij}}.$$

A formula for adjusting the weights $W_{jk}$ is:

$$\Delta W_{jk} = -\delta \frac{\partial E}{\partial W_{jk}}.$$

Furthermore, δ is a learning rate. The number of neurons of the input layer, the number of neurons of the hidden layer, the number of hidden layers, and the setting of the learning rate $\delta$ affect a training effect of the neural network.

FIG. 7 is a flowchart of a deep learning method of the light source color coordinate estimation system according to the second embodiment of the present disclosure. Comparing FIG. 7 with FIG. 6, the main difference between the second embodiment and the first embodiment lies in that, the deep learning method of FIG. 7 further includes step S715 and step S717, and steps S701 to S713 of FIG. 7 are the same as steps S601 to S613 of FIG. 6. In step S715, it is determined whether or not the color coordinate deviation is within a deviation convergence interval when executing the deep learning process for the light sources is completed. In step S717, additional light sources are provided and the deep learning process is sequentially executing for the additional light sources when one of the color coordinate deviations exceeds the deviation convergence interval. For example, twenty light sources that are different from each other are provided and the deep learning process is sequentially executing for the twenty light sources. The preset deviation convergence interval is within −2%~2%. When one of twenty color coordinate deviations is outside the interval, additional light sources which are different from the twenty light sources are provided and the deep learning process is sequentially executing for the additional light sources.

When each of the color coordinate deviations is within the deviation convergence interval, the deep learning process for the light sources is completed. When the deep learning process for the light sources is completed, a test light source is provided and the test light source emits a test beam to the light source color coordinate estimation system which has been trained by the deep learning process. The light source color coordinate estimation system generates an estimated color coordinate of the test beam. Any deviation between the estimated color coordinate of the test beam and an actual color coordinate of the test beam is within −2%~2%, which meets a usage requirement.

Figure 8A:
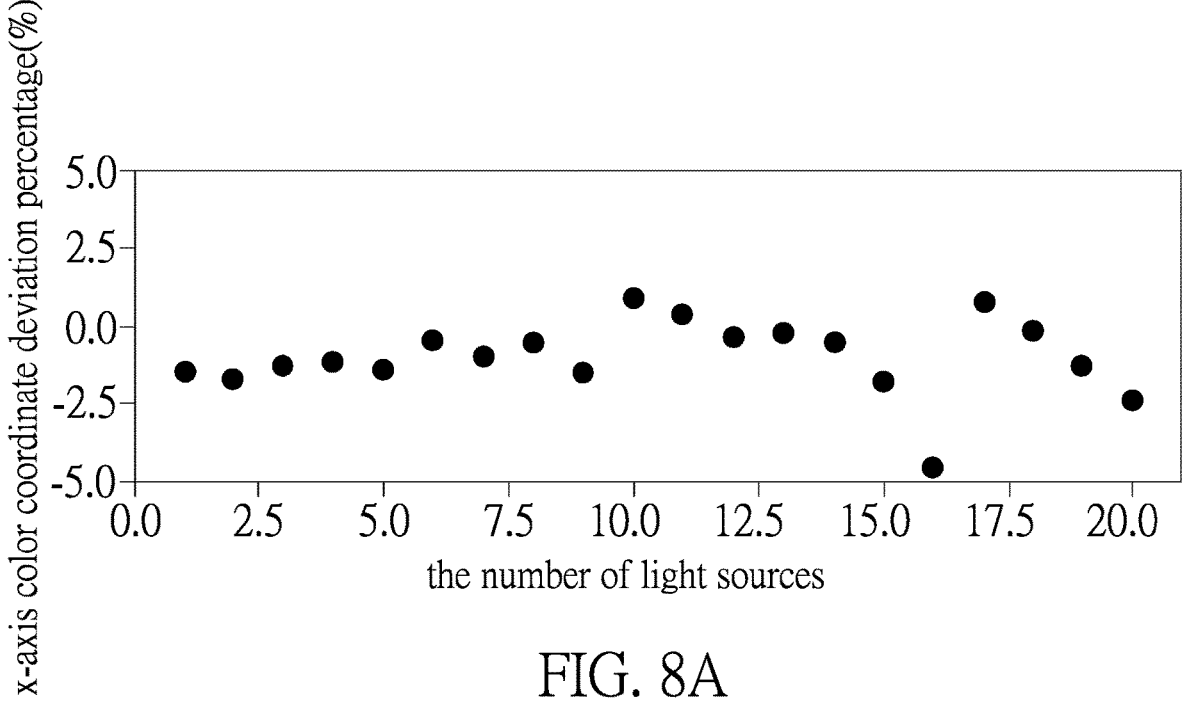
FIG. 8A is a distribution diagram of x-axis color coordinate deviations of a light source color coordinate estimation system.
Figure 8B:
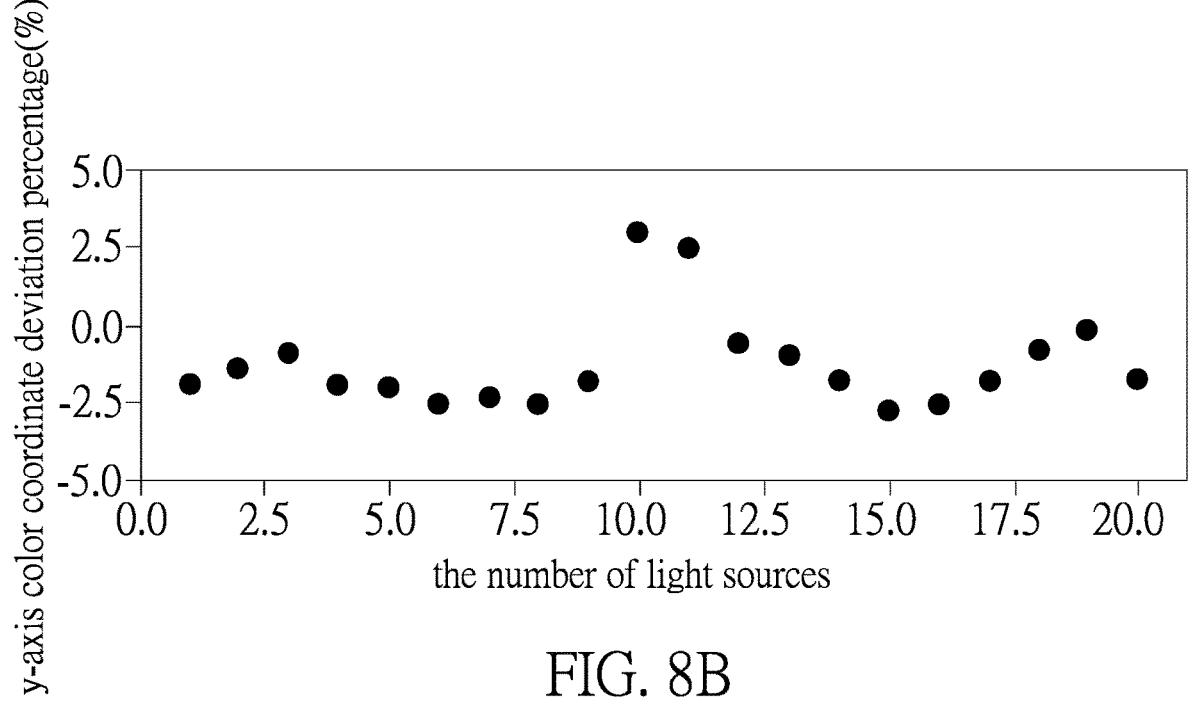
FIG. 8B is a distribution diagram of y-axis color coordinate deviations of the light source color coordinate estimation system.

FIG. 8A is a distribution diagram of x-axis color coordinate deviations of a light source color coordinate estimation system, and FIG. 8B is a distribution diagram of y-axis color coordinate deviations of the light source color coordinate estimation system. Referring to FIG. 8A and FIG. 8B, a quantity of light sources that are different from each other is twenty. The twenty light sources respectively emit beams to the light source color coordinate estimation system in sequence, and the beam emitted by each of the twenty light source has a preset x-axis color coordinate and a preset y-axis color coordinate, and twenty x-axis estimated color coordinates calculated by the light source color coordinate estimation system are compared with the preset twenty x-axis color coordinates to generate twenty x-axis color coordinate deviation percentages of FIG. 8A. The twenty x-axis color coordinate deviation percentages are distributed between −5% and 5%, which conforms to an actual standard in use. Similarly, twenty y-axis estimated color coordinates calculated by the light source color coordinate estimation system are compared with the preset twenty y-axis color coordinates to generate twenty y-axis color coordinate deviation percentages of FIG. 8B. The twenty y-axis color coordinate deviation percentages are distributed between −5% and 5%, which conforms to an actual standard in use.

Figure 9:
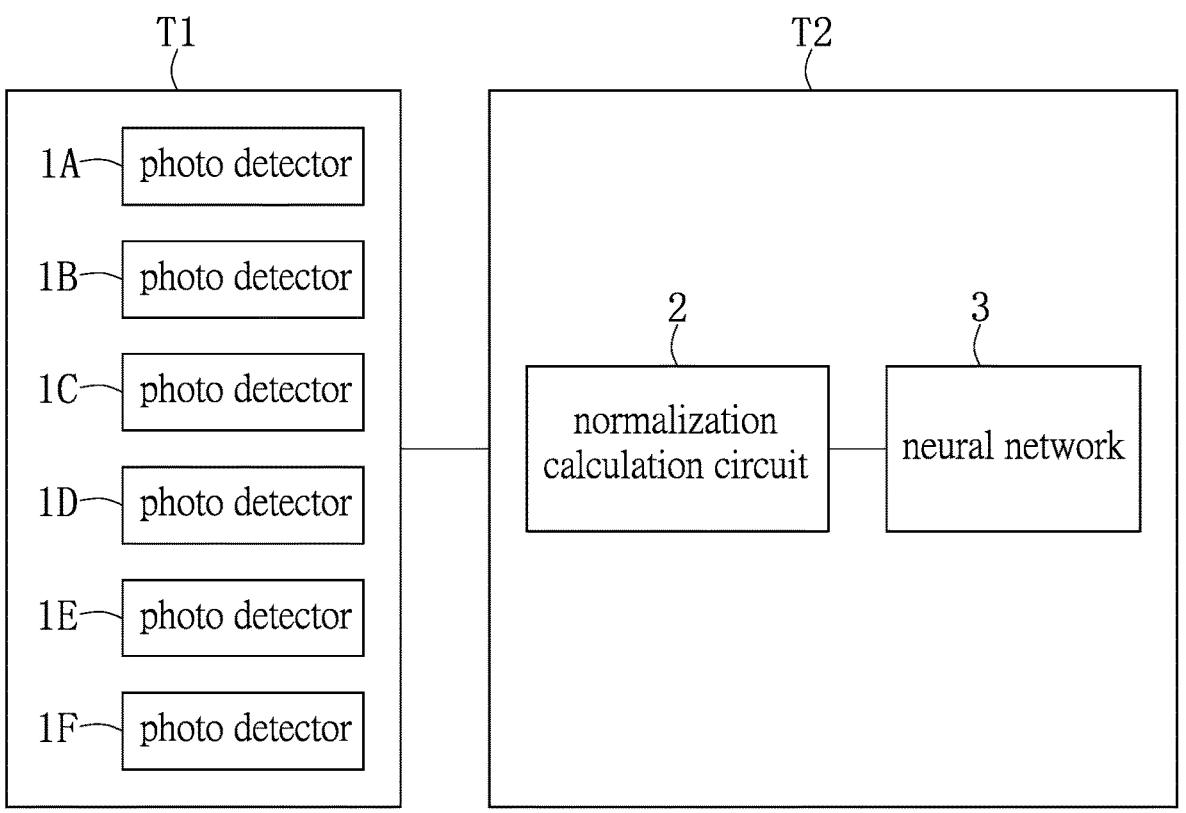
FIG. 9 is a schematic view of the light source color coordinate estimation system in a first use state.

FIG. 9 is a schematic view of the light source color coordinate estimation system in a first use state. Referring to FIG. 9, the photo detectors 1A to 1F are disposed at a user device T1, and the user device T1 is, for example, a mobile device, a laptop, or a wearable device of a user. The normalization calculation circuit 2 and the neural network 3 are disposed at a remote host T2. The remote host T2 is, for example, a server or a cloud computer. The user device T1 is communicatively connected to the remote host T2. Therefore, the more complicated calculations of the light source color coordinate estimation system are assigned to be processed by hardware of the remote host T2.

Figure 10:
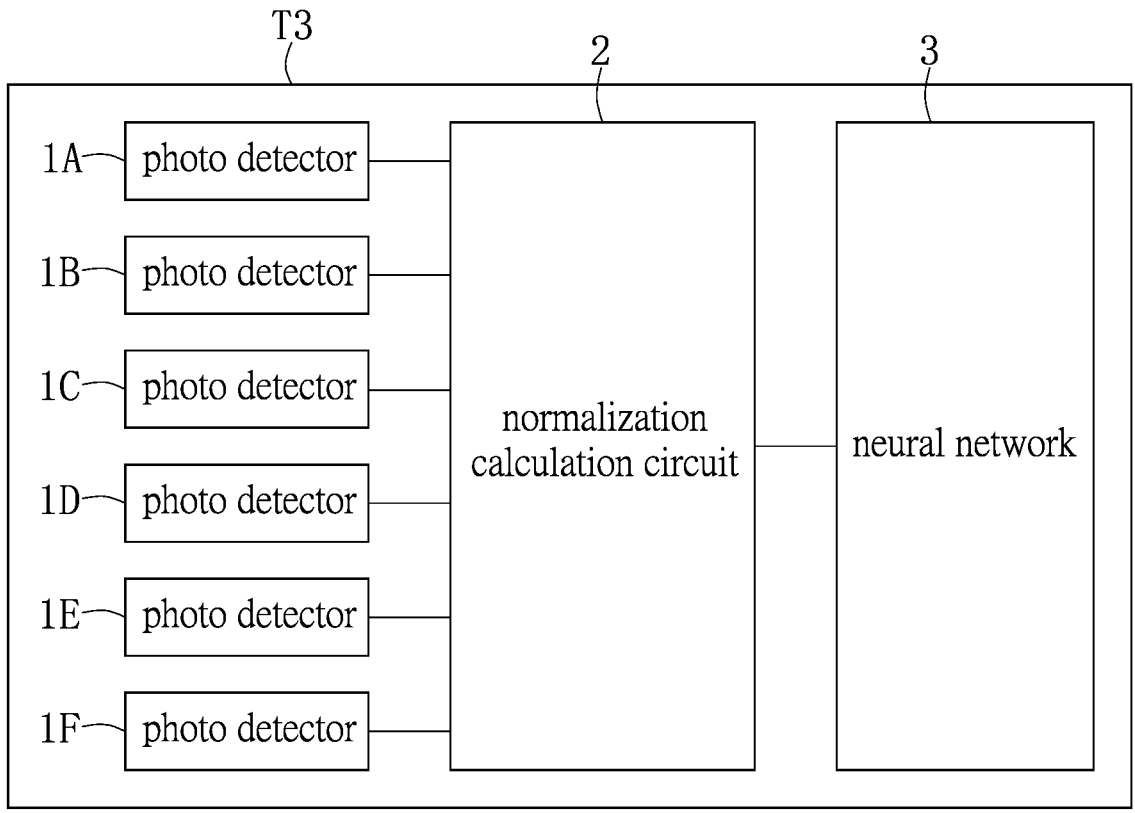
FIG. 10 is a schematic view of the light source color coordinate estimation system in a second use state.

FIG. 10 is a schematic view of the light source color coordinate estimation system in a second use state. Referring to FIG. 10, the photo detectors 1A to 1F, the normalization calculation circuit 2, and the neural network 3 are integrated in a system chip T3, and the system chip T3 can be disposed in a mobile device, a laptop, or a wearable device of a user.

BENEFICIAL EFFECTS OF THE EMBODIMENTS

In conclusion, the neural network performs a deep learning process for sensing differences of different photo detectors, the photo detectors respectively have different detection wavebands, and a sum of the detection wavebands preferably covers a range of a visible light waveband (380 nm~700 nm). Therefore, the neural network has high anti-interference capability such that the estimated color coordinate generated by the neural network is more accurate. Furthermore, the normalization calculation circuit normalizes a plurality of energy integral values each time the light source emits a beam. Accordingly, the energy integral value of each of the photo detectors is not weakened due to an intensity of the beam emitted by the light source or a reflectivity of a surface of the light source such that the estimated color coordinate is more accurate. Furthermore, since the neural network directly estimates a color coordinate of the light source, a deviation generated by converting RGB values to a color coordinate can be avoided.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A light source color coordinate estimation system, comprising:

a plurality of photo detectors, wherein a number of the plurality of photo detectors is larger than three, the plurality of photo detectors generate spectral responses respectively after receiving a beam emitted by a light source, and the spectral responses respectively have different detection wavebands and energy integral values corresponding to the detection wavebands;

a normalization calculation circuit electrically connected to the plurality of photo detectors, wherein the normalization calculation circuit obtains each of the energy integral values and respectively divides the energy integral values by a largest of the energy integral values to generate a plurality of normalized energy integral values; and a neural network, wherein an input end of the neural network is electrically connected to the normalization calculation circuit, and the neural network includes a plurality of neurons, wherein the plurality of neurons are connected by a plurality of synapses, each of the synapses has a weight, and at least a part of the plurality of neurons respectively include activity functions, wherein the input end of the neural network receives the normalized energy integral values and converting the normalized energy integral values into an estimated color coordinate by operations of the activity functions and the weights, and an output end of the neural network outputs the estimated color coordinate of the light source.

2. The light source color coordinate estimation system according to claim 1, wherein a sum of the detection wavebands covers a range from 380 nm to 700 nm.

3. The light source color coordinate estimation system according to claim 1, wherein the plurality of neurons includes a plurality of input-layer neurons, and the input-layer neurons are located at an input layer of the neural network, wherein a number of the input-layer neurons is equal to a number of the photo detectors, and the input-layer neurons respectively obtain the normalized energy integral values.

4. The light source color coordinate estimation system according to claim 1, wherein the neural network includes an input layer, a plurality of hidden layers, and an output layer, the input layer and the output layer are respectively connected with two of the hidden layers, and any two adjacent ones of the hidden layers are connected to each other, wherein the plurality of neurons includes a plurality of hidden layer neurons, and each of the plurality of hidden layers includes a part of the plurality of hidden layer neurons.

5. The light source color coordinate estimation system according to claim 4, wherein each of the activity functions of the hidden layer neurons is a sigmoid function.

6. The light source color coordinate estimation system according to claim 1, wherein the plurality of photo detectors are disposed at a user device, and the normalization calculation circuit and the neural network are disposed at a remote host.

7. The light source color coordinate estimation system according to claim 1, wherein the plurality of photo detectors, the normalization calculation circuit, and the neural network are disposed in a system chip.

8. A deep learning method of a light source color coordinate estimation system, comprising:

providing a plurality of light sources that are different from each other; and sequentially executing a deep learning process for the light sources;

wherein the deep learning process executing for each of the light sources includes:

receiving, by a plurality of photo detectors having different detection wavebands respectively, a beam from the light source;

wherein a number of the plurality of photo detectors is larger than three;

generating, by the plurality of photo detectors, spectral responses respectively;

obtaining energy integral values corresponding to the detection wavebands for each of the spectral responses through a normalization calculation circuit;

dividing the energy integral values by a largest of the energy integral values respectively through the normalization calculation circuit so as to generate a plurality of normalized energy integral values;

receiving the plurality of normalized energy integral values through a neural network, wherein the neural network includes activity functions and weights;

converting the plurality of normalized energy integral values into an estimated color coordinate of the light source by calculations of the activity functions and the weights;

calculating a color coordinate deviation between the estimated color coordinate and a preset color coordinate; and adjusting at least one of the weights according to a back propagation algorithm and the color coordinate deviation.

9. The deep learning method according to claim 8, wherein a sum of the detection wavebands covers a range from 380 nm to 700 nm.

10. The deep learning method according to claim 8, further comprising: determining whether or not the color coordinate deviation is within a deviation convergence interval when executing the deep learning process for the light sources is completed, and providing additional light sources and sequentially executing the deep learning process for the additional light sources when one of the color coordinate deviations exceeds the deviation convergence interval.

11. The deep learning method according to claim 8, wherein a test light source is provided when each of the color coordinate deviations is within a deviation convergence interval, the test light source emits a test beam, the light source color coordinate estimation system receives the test beam and generates an estimated color coordinate of the test beam.

* * * * *